United States Patent
Goel et al.

(10) Patent No.: US 7,109,987 B2
(45) Date of Patent: Sep. 19, 2006

(54) METHOD AND APPARATUS FOR DUAL PASS ADAPTIVE TESSELLATION

(75) Inventors: Vineet Goel, Winter Park, FL (US); Stephen L. Morein, Cambridge, MA (US); Robert Scott Hartog, Windermere, FL (US)

(73) Assignee: ATI Technologies Inc., Markham (CA)

( * ) Notice: Subject to any disclaimer, the term of this patent is extended or adjusted under 35 U.S.C. 154(b) by 297 days.

(21) Appl. No.: 10/790,952

(22) Filed: Mar. 2, 2004

(65) Prior Publication Data

US 2005/0195188 A1    Sep. 8, 2005

(51) Int. Cl.
*G06T 15/30*    (2006.01)
(52) U.S. Cl. .................. 345/423; 345/419; 345/502; 345/505; 345/506; 345/519; 345/532; 345/536; 345/538
(58) Field of Classification Search ................ 345/419, 345/423, 502, 505, 506, 519, 532, 536, 538
See application file for complete search history.

(56) References Cited

U.S. PATENT DOCUMENTS

| | | | | |
|---|---|---|---|---|
| 5,821,940 A | * | 10/1998 | Morgan et al. | 345/420 |
| 6,078,331 A | * | 6/2000 | Pulli et al. | 345/423 |
| 6,697,063 B1 | * | 2/2004 | Zhu | 345/421 |
| 6,819,325 B1 | * | 11/2004 | Boyd et al. | 345/559 |
| 6,965,908 B1 | * | 11/2005 | Shaw | 708/603 |

* cited by examiner

*Primary Examiner*—Kimbinh T. Nguyen
(74) *Attorney, Agent, or Firm*—Vedder, Price, Kaufman & Kammholz. P.C.

(57) ABSTRACT

A method and apparatus for dual pass adaptive tessellation includes a vertex grouper tessellator operably coupled to receive primitive information and an index list and a shader processing unit coupled to the vertex grouper tessellator. During a first pass, the shader processing unit receives primitive indices generated from the primitive information and an auto-index value for each of the plurality of primitive indices. The method and apparatus further includes a plurality of vertex shader input staging registers operably coupled to the shader sequence, wherein the plurality of vertex shader input staging registers are coupled to a plurality of vertex shaders such that in response to a shader sequence output, the vertex shaders generate tessellation factors. The tessellation factors are provided to the vertex grouper tessellator such that the vertex grouper tessellator generates a per-process vector output, a per primitive output and a per packet output during a second pass.

25 Claims, 4 Drawing Sheets

METHOD AND APPARATUS FOR DUAL PASS ADAPTIVE TESSELLATION

FIELD OF THE INVENTION

The present invention relates generally to graphics rendering and more specifically to the generation of standardized tessellation factors for rendering an image.

BACKGROUND OF THE INVENTION

In a graphics processing system, objects to be displayed are generally represented by a collection of polygons. Polygons are generally chosen due to the existence of efficient algorithms for the rendering thereof. However, frequently the object that is approximated by polygons is really a curved shape. Most methods for describing these surfaces fall under the classification of "higher order surfaces" (HOS).

Patches, such as a Bezier patch; may represent a surface of an object. These are one representative type of HOS. These patches may typically contain information beyond standard pixel information and may further include information relating to surface normals, lighting source orientation, surface color and opacity and coordinates of a texture image to be mapped onto the surface. Sub-dividing the patches until the sub-patches are sufficiently flat so they may be approximated by a quadrilateral may be used to render the HOS or any other criterion to subdivide patches to render. The sub-patches may then be divided into triangles for graphics processing.

Another problem that occurs is the relative location of the object, such as a primitive, within a viewable output screen. The primitive, such as a triangle, defines an area include a plurality of pixels and due to the size of the primitive and the location of the primitive within a rendered scene, the ratio of the number of pixels relative to the primitive may be skewed.

As primitive may be deeper within the rendered scene, such as having a smaller depth value, the ratio of pixels per primitive may be reduced. During the rendering of the pixels, the depth offset may adversely affect the computation of tessellation factors. Using an adaptive tessellation technique, various adaptive tessellation factors may be computed using a software algorithm. Although, the technique includes processing time limitations and further includes space limitations as there must be physical space within a graphics processing system for a processor, such as a general purpose processor, executing operating instructions for calculating the adaptive tessellation factors.

Therefore, during the processing of tessellation factors, this technique may be inefficient as it requires the offloading of vertex information, the computation of the adaptive tessellation factors and loading these tessellation factors back into the processing pipeline.

Another approach utilized for generating tessellation factors is an independent hardware configuration, which interfaces with the graphics rendering pipeline. This hardware approach provides a separate processor in communication with the graphics rendering pipeline, and thus not only requires valuable real estate for the extra hardware, but also requires further processing time for the transmission of primitive indices to the hardware device and the transmission of vertex tessellated data back to the processing pipeline.

During the generation of tessellation factors, there are also limitations regarding the adaptability of the tessellation engine to perform discrete tessellation, continuous tessellation and adaptive tessellation. Current solutions provide for a tessellation engine to be designated for performing a predetermined type of tessellation, thereby only allowing for the reception of limited primitive types and thereby limited tessellation patterns.

As such, there exists a need for generating tessellation factors independent of the primitive types, wherein the tessellation factor generation efficiently uses existing available processing resources and without adversely affecting system processing speeds.

BRIEF DESCRIPTION OF THE DRAWINGS

The present invention will be more readily understood with reference to the following drawings, wherein.

DETAILED DESCRIPTION OF A PREFERRED EMBODIMENT

Figure 1:
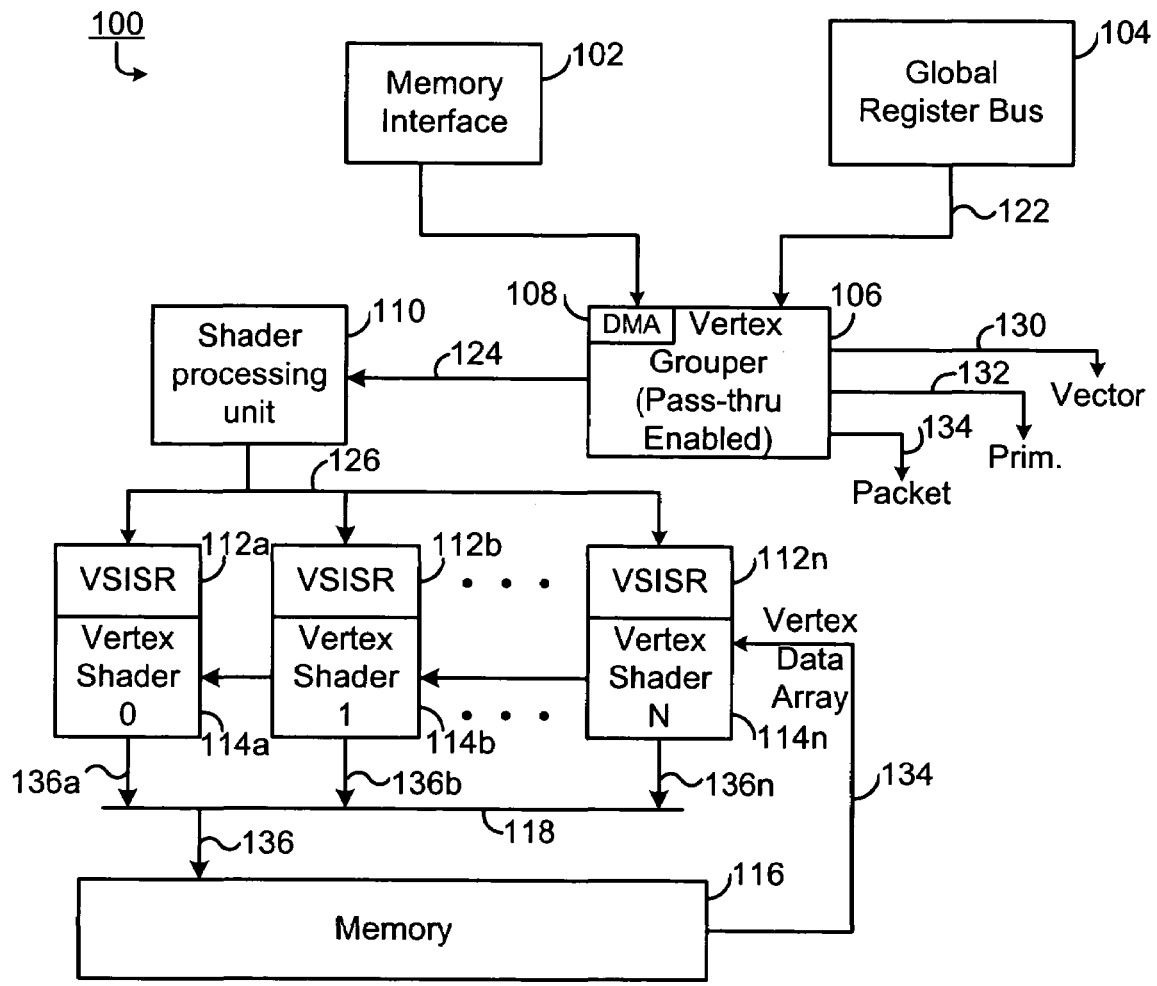
FIG. 1 illustrates an apparatus for dual pass adaptive tessellation as configured during a first pass in accordance with one embodiment of the present invention.

FIG. 1 illustrates an apparatus 100 for dual pass adaptive tessellation. The apparatus 100 includes a memory interface 102, a global register bus 104, and a vertex grouper tessellator 106 having a direct memory access engine 108 dispose therein. The apparatus 100 further includes a shader processing unit 110, a plurality of vertex shader input staging registers 112 coupled to a plurality of vertex shaders 114 and a memory 116 coupled to the shaders 114 across a bus 118. The shader processing unit 110 may be a sequencer or a control flow processor. Moreover, each of the shaders 114 includes a math processing unit, which may be any suitable processing unit capable of executing mathematical operations.

In one embodiment, the vertex grouper tessellator 106 is pass-through enabled for a first pass. During the first pass, an index list 120 is provided from the memory interface 102 to the direct memory access engine 108. Furthermore, vertex grouper tessellator state data, direct memory access request data and a draw initiator 122 are received from the global register bus 104 by the vertex grouper tessellator 106. The indices of primitives are sent through the vertex grouper tessellator 106 to be loaded into registers of shader pipes, such as registers 112 and shaders 114. The vertex grouper tessellator 106 also sends an auto-index value for each primitive to one of the shader registers 112. Most specifically, the vertex grouper tessellator 106 provides primitive information 124 to the shader sequence 110 which thereupon distributes partitioned information 126 to each of the vertex shader input state registers 112.

The vertex grouper tessellator 106, during a first pass, also generates a per-process vector 130, per primitive data 132 and per packet data 134. During the first pass, no pixels are generated, but the signals 130–134 may still have to pass synchronization signals for vertex and state deallocation.

Referring back to the shader pipeline, the vertex shaders 114 receive vertex data arrays 134 retrieved from the memory 116. The shader processing unit 110 fetches corner vertices of high order surface primitives and computes tessellation factors based on corner vertices of edges of primitives. In another embodiment, during the first pass, the vertex shaders 114 could also generate control points for high order surfaces. The tessellator 106 is disabled during this pass.

Each of the vertex shaders 114 thereupon provides these computed values. In one embodiment, original indices 136 are written to the memory 116 across the bus 118 at indexed location as specified by auto-index value. In one embodiment, the control points and tessellation factors are written in separate linear buffers.

During the second pass, more than one index can be passed to the vertex grouper tessellator 106 along with primitive types such as tri-list, quad-list, line-list, rect-patch, line-patch, or tri-patch. The vertex grouper tessellator 106 generates the parametric coordinates (u, v) for tensor products surfaces or barycentric coordinates (u, v, w) for triangular surfaces using tessellation factors computed during the first pass. These coordinates, along with original indices and/or an auto-index value, are passed to the shader register 112 for evaluating tessellated vertices based on user evaluation shaders. The tessellation engine 100 also generates sub-primitive information for clipper and primitive assemblers for paths 134, 132, 130.

Figure 2:
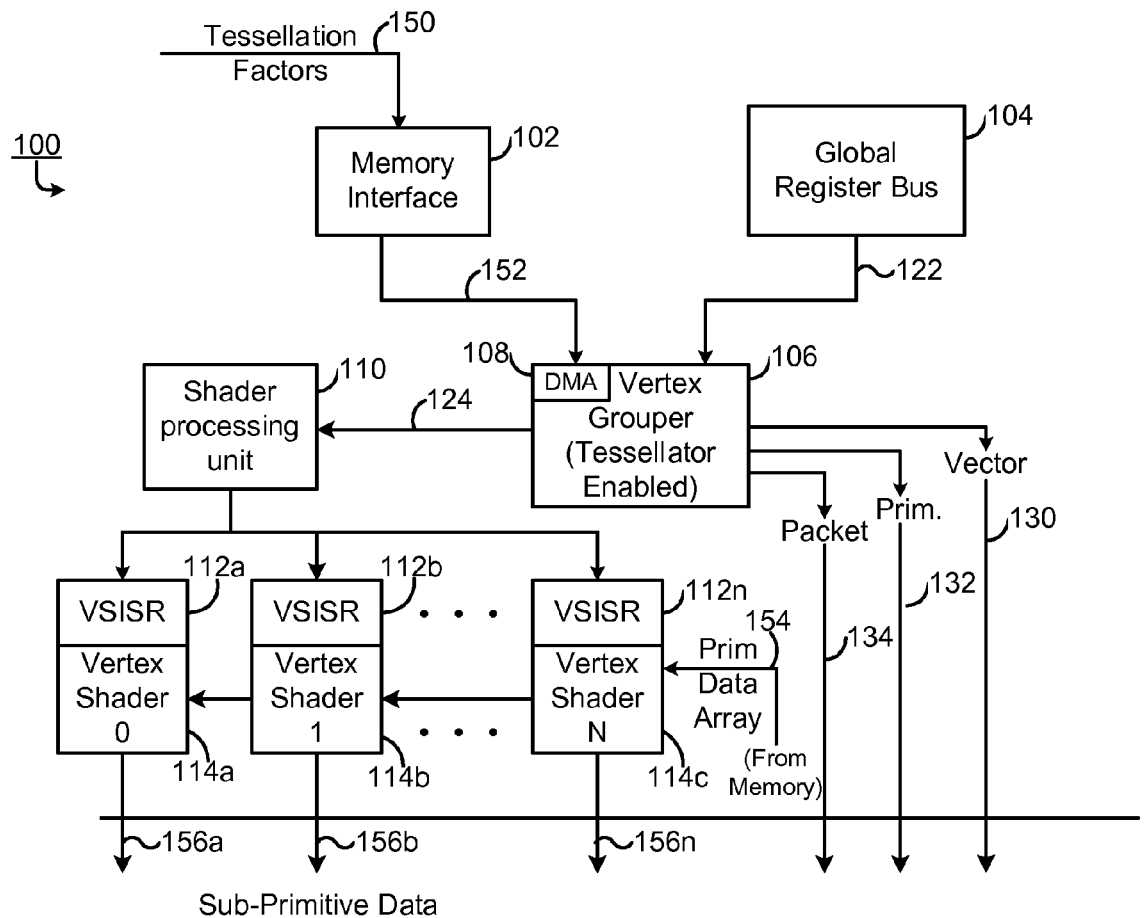
FIG. 2 illustrates the apparatus for dual pass adaptive tessellation as configured during a second pass in accordance with one embodiment of the present invention.

FIG. 2 illustrates the apparatus 100 through a second pass, with the vertex grouper tessellator 106 being enabled. The memory interface 102 receives a plurality of tessellation factors 150 received from the memory 116 of FIG. 1. Using the direct memory access engine 108 within the vertex grouper tessellator 106, the tessellation factors are retrieved by a direct memory access request 152, wherein the tessellation factors are provided for the vertex grouper tessellator 106 operating in an adaptive mode. In this second pass, the tessellation factors 150 are accessed as indices and an auto index is generated, wherein the auto index 124 is loaded to the registers 112 of the shaders 114. A primitive mode indicator set to a tessellation mode such that the indices that go to the tessellation engine are interpreted as tessellation factors. The vertex group tessellator 106 generates barycentric or tensor coordinates which are loaded to the shader registers 112 along with the auto-index value. The shaders 114 compute the tessellated vertices by fetching control points from locations specified by the auto-index value and using barycentric or tensor product coordinates.

In one embodiment, a primitive data array 154 is retrieved from memory such that the vertex shaders 114 may be utilized for the generation of newly computed sub-primitive information 156.

The vertex grouper tessellator 106 further generates the vector information 130, primitive information 132 and packet information 134. The per process vector information 130 includes state context vector and process vector size information. The per primitive information 132 includes sub-primitive assembly data including internal vertex indices, end of packet information and de-allocation information. The per packets information 134 includes state context vector and a sub-primitive type information.

Therefore, by using a dual-pass system for adaptive tessellation, the vertex grouper tessellator 106 is disabled in a pass-through mode for generating tessellation factors using the shaders 114 during pass one and the tessellator part of vertex grouper tessellator 106 is enabled in a tessellator mode for the second pass such that the tessellation factors themselves are used to generate tessellation outputs such as the per process vector output, the per primitive output and the per packet output, in conjunction with the sub-primitive data 156. As such, the present invention utilizes a single tessellation engine 100 and reuses the same engine with different primitive types to generate the needed output. Therefore, the present invention not only reduces the amount of real estate needed for hardware components, the engine 100 improves processing efficiency by allowing for the generation of tessellation output within the pixel/vertex processing pipeline.

The tessellation engine also generates vertices based on a vertex reuse number available to it, therefore providing for a scalable design. In one embodiment, a vertex reuse number may be a data indicator indicating the availability reutilizing vertex information which may be stored within a internal memory. The present invention allows for a compact design of the tessellation engine, a form of programmable tessellation where evaluation part can be specified by an end user. The present invention further includes a large range of primitive types per tessellation and a form of device capable of allowing data explosion by generating more vertices in providing sub primitive information.

In one embodiment, the tessellation engine 100 is a fixed-function block. This engine 100 understands a finite set of modes, each of which is defined for a specific purpose. The below table shows all of the modes supported by the present invention. As recognized by one having ordinary skill in the art, the below table indicates various modes for exemplary purposes only and illustrates one embodiment of the present invention. As recognized by one having ordinary skill in the art, any other suitable implementation in accordance with the information listed below for adaptive tessellation may also be suitably implemented within the scope of the present invention.

| Mode Name | Prim Type (from PG) | Index Memory Size | Two Cycle Input Mode | Cycle 0 | Cycle 1 | Two Cycle Output Mode | Tess Output (all fixed) | VTG Output Prim Type | VGT Output (all floats) |
|---|---|---|---|---|---|---|---|---|---|
| Line List - Single | 2 | std | 0 | 2 std indx | — | 0 | 2 std indx | Line List | 2 indx 1 coord |
| Tri List - Single | 4 | std | 0 | 3 std indx | — | 1 | 3 std indx | Tri List | 3 indx 3 coord |
| Quad List - | 13 | std | 1 | 3 std | 1 std | 1 | 4 std | Tri List | 4 indx |

-continued

| | Tesselator Input | | | | | Tesselator Output | | | |
|---|---|---|---|---|---|---|---|---|---|
| Mode Name | Prim Type (from PG) | Index Memory Size | Two Cycle Input Mode | Cycle 0 | Cycle 1 | Two Cycle Output Mode | Tess Output (all fixed) | VTG Output Prim Type | VGT Output (all floats) |
| Single L-Patch - Single Pass | 24 | std | 0 | 1 std indx | indx | 0 | 1 std indx | Line List | 2 coord 1 std indx 1 coord |
| T-Patch - Single Pass | 25 | std | 0 | 1 std indx | indx | 1 | 1 std indx 1 quad | Tri List | 1 std indx 1 quad id 3 coord |
| R-Patch - Single Pass | 26 | std | 0 | 1 std indx | — | 1 | 1 std indx 1 quad | Tri List | 1 std indx 1 quad id 2 coord |
| Last of Multi-pass | 24 | — | 0 | 1 auto-index | — | 0 | 1 auto-index 1 quad | Line List | 1 auto 1 quad id 1 coord |
| Last of Multi-pass | 24 | 1 tess factor (float) | 0 | 1 tess factor (float) | — | 0 | 1 auto-index 1 quad | | 1 auto 1 quad id 1 coord |
| Last of Multi-pass | 25 | — | 0 | 1 auto-index | — | 1 | 1 auto-index 1 quad | Tri List | 1 auto 1 quad id 3 coord |
| Last of Multi-pass | 25 | 3 tess factors (float) | 1 | 3 tess factors (float) | 1 auto-index | 1 | 1 auto-index 1 quad | | 1 auto 1 quad id 2 coord |
| Last of Multi-pass | 26 | — | 0 | 1 auto-index | — | 1 | 1 auto-index 1 quad | Tri List | 1 auto 1 quad id 2 coord |
| Last of Multi-pass | 26 | 4 tess factors (float) | 1 | 3 tess factors (float) | 1 tess factor 1 | 1 | 1 auto-index 1 quad | | 1 auto 1 quad id 2 coord |

In one embodiment, the tessellation engine 100 was enabled by selecting the tessellation engine path in a output path control register, indicating either continuous, discrete or adaptive. The tessellation engine also specifies a maximum tessellation level. For adaptive tessellation mode, this is the maximum tessellation clamp value. For continuous and discrete tessellation mode this is a tessellation level. For the adaptive tessellation mode, there is a minimum tessellation clamp value. For continuous and discrete tessellation loads, this register is not applicable in this embodiment of this present invention.

Figure 3:
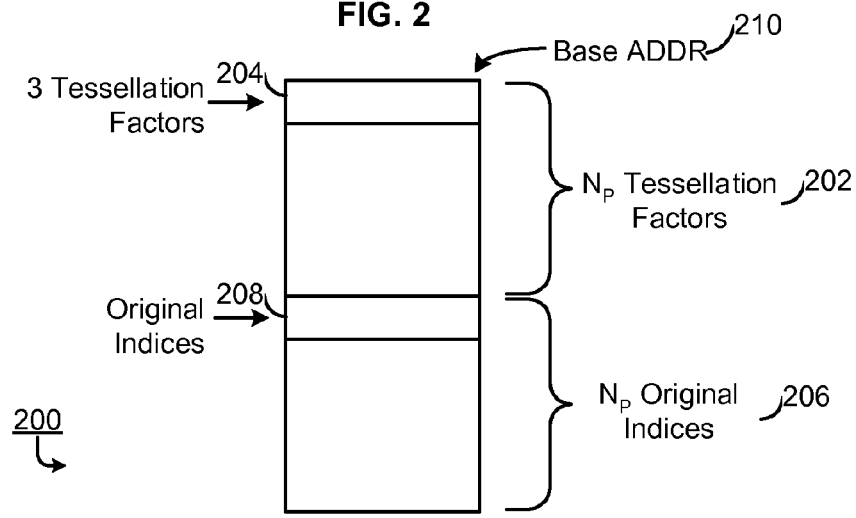
FIG. 3 illustrates a memory storing tessellation and index information in accordance with one embodiment of the present invention.

FIG. 3 illustrates an exemplary embodiment of a data field 200 which may be stored in the memory 116 of FIG. 1. The data 200 includes a tessellation factor field 202 storing three tessellation factors 204 for a triangle primitive type and an original indices field 206 storing original indices 208. The data field 200 further includes a base address 210 for reference of the tessellation factor therefrom. The tessellation factors 202 and the original indices 206 may have a data size relative to the corresponding number of vertex shaders 114 of FIG. 2 such that the associated tessellation information may be generated therefrom. It is recognized by one having ordinary skill in the art and any other suitable memory data structure may be implemented and that the data structure 200 of FIG. 3 is for illustration purposes only.

Figure 4:
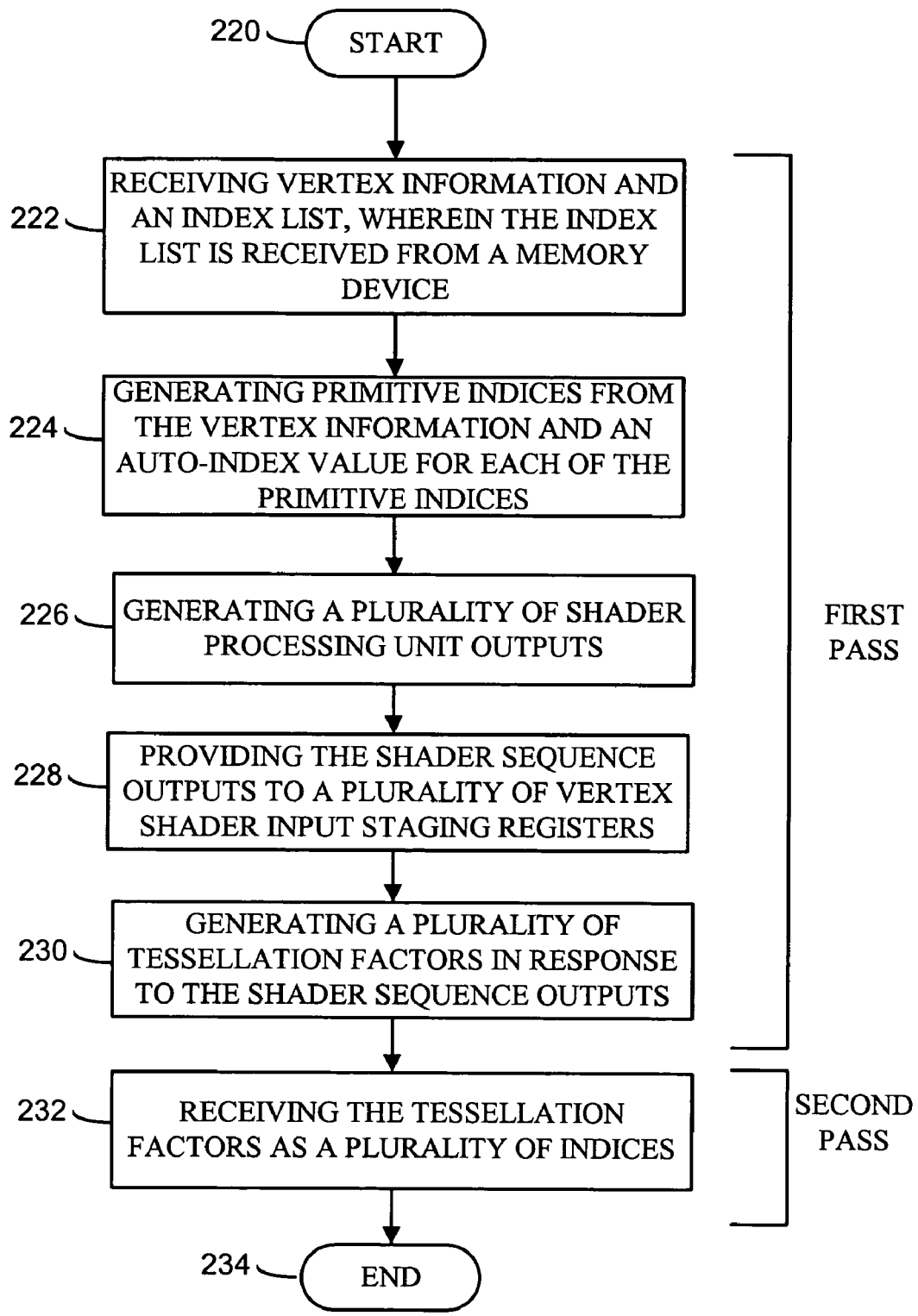
FIG. 4 illustrates a flow chart of the steps of a method for dual pass adaptive tessellation in accordance with one embodiment of the present invention.

FIG. 4 illustrates the steps of the method for dual pass adaptive tessellation. The method begins, step 220, by receiving vertex information and an index list, wherein the index list is received from a memory device in step 222. With reference to FIG. 1, index list 120 is retrieved from a memory interface across a direct memory access engine 108. The next step, step 224, consists of generating primitive indices from the vertex information and an auto-index value for each of the primitive indices. Also from the first pass, the next step is generating a plurality of shader sequence outputs 226. Illustrated with reference to FIG. 1, the plurality of shader sequence outputs 126 are provided to the plurality of vertex shader input staging registers 112, step 228. Therefore, within the first pass, a plurality of tessellation factors are generated in response to shader sequence output, step 230.

The vertex shader output 136, in one embodiment, is stored in a memory such that it may be further received as a plurality of indices, step 232, during a second pass. As illustrated in FIG. 2, the tessellation factors 150 are provided to the memory interface 102 such that they may be retrieved from the direct memory access engine 108. As such, one embodiment of the method is complete, step 234.

Figure 5:
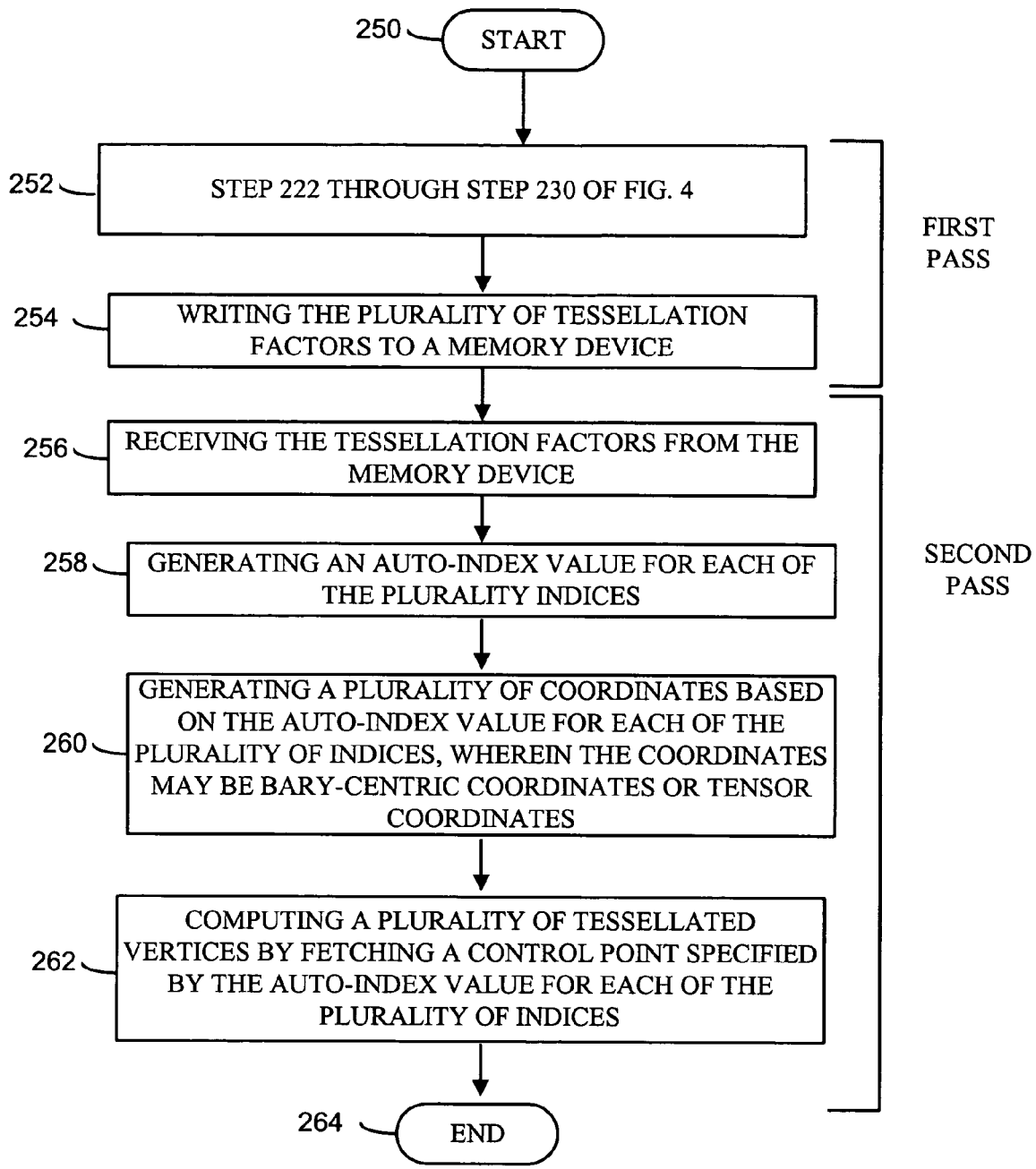
FIG. 5 illustrates a flow chart of the steps of another method for dual pass adaptive tessellation in accordance with another embodiment of the present invention.

FIG. 5 illustrates another embodiment of a method for dual pass adaptive tessellation. The method begins, 250, by performing the steps during a first pass of the steps 222 through 230 of FIG. 4, step 252. As discussed above, the steps include receiving primitive information and an index list, and an auto-index value for each of the primitive indices, generating a plurality of shader sequence outputs, providing the shader sequence outputs to a plurality of vertex shader input staging registers and generating a plurality of tessellation factors in response to the shader sequence outputs. The next step, step 254, is writing the plurality of tessellation factors to a memory device. As discussed above with regards to FIG. 1, the memory 116 may be any suitable memory device capable of storing and allowing for the retrieval of the tessellation factors therefrom. Steps 252 and 254, in the present embodiment, occurred during a first pass of the tessellation engine 100 of FIGS. 1 and 2.

During a second pass, the first step, 256, is receiving the tessellation factors from the memory device. The next step, step 258, is generating an auto-index value for each of the plurality of indices. The next step, step 260, is generating a plurality of barycentric coordinates based on the tessellation factors, or in another embodiment, tensor product coordinates may be computed based on primitive type. As discussed above, the coordinates may be (u, v) or (u, v, w) based on the higher order surface.

Still within the second pass, the next step, step 262, is computing a plurality of tessellated vertices by fetching a control point specified by the auto-index value for each of the plurality and indices. In one embodiment, the control point specified by the auto-index value for each of the plurality of indices may be disposed within the memory 116 illustrated in FIG. 1 and provided to the vertex shaders 114. As such, output signals 130, 132 and 134 generated by the vertex grouper tessellator 106 of FIG. 1 and sub-primitive data further generated by the vertex shaders 114 of FIG. 2.

It should be understood that there exists implementations of other variations and modifications of the invention and its various aspects, as may be readily apparent to those of ordinary skill in the art, and that the invention is not limited by the specific embodiments described herein. For example, the number of vertex shaders and vertex shader instruction staging registers may be adjusted based on the number of tessellation factors to be computed and the shader processing unit output may also be adjusted to correspond to the number of vertex shaders and vertex shader instruction staging registers. It is therefore contemplated and covered by the present invention any and all modifications, variations, or equivalents that fall within the scope of the basic underlying principles disclosed and claimed herein.

What is claimed is:

1. An apparatus for dual pass adaptive tessellation comprising:
   a vertex grouper tessellator operably coupled to receive primitive information and an index list, wherein the index list is received from a memory device;
   a shader processing unit coupled to the vertex grouper tessellator, wherein during a first pass, the shader processing unit receives primitive indices and an auto-index value for each of the primitive indices;
   a plurality of vertex shader input staging registers operably coupled to the shader processing unit, each of the plurality of vertex shaders input staging registers coupled to one of a plurality of vertex shaders such that in response to a shader sequence output, the plurality of vertex shaders generate tessellation factors; and the tessellation factors are provided to the vertex grouper tessellator such that the vertex grouper tessellator generates a per process vector output, a per primitive output and a per packet output.

2. The apparatus of claim 1 wherein the tessellation factors are provided from the plurality of vertex shaders to a memory such that the memory may provide the tessellation factors to the vertex grouper tessellator.

3. The apparatus of claim 1 wherein a plurality of coordinates are generated by the vertex grouper tessellator in response to the plurality of tessellation factors.

4. The apparatus of claim 3 wherein the plurality of coordinates are at least one of: barycentric coordinates and tensor coordinates.

5. The apparatus of claim 3 wherein a plurality of tessellated vertices are generated by the plurality of vertex shaders in response to a plurality of control points and the plurality of coordinates.

6. The apparatus of claim 1 wherein a plurality of control points for higher order surfaces are generated by the plurality of vertex shaders based on a plurality of corner vertices of a plurality of primitives.

7. An apparatus for dual pass adaptive tessellation comprising:
   a vertex grouper tesselator operably coupled to receive primitive information and a vertex index list from a memory device;
   a shader processing unit coupled to the vertex grouper tessellator, wherein during a first pass, the shader processing unit receives primitive indices and an auto-index value for each of the primitive indices;
   wherein the memory device is operably coupled to a plurality of vertex shaders such that tessellation factors are stored therein and wherein each of the plurality of vertex shaders comprises a math processing unit coupled to the vertex grouper tessellator, the math processing unit including a plurality of input staging registers and a plurality of arithmetic logic units;
   a control flow processor operatively coupled to the math processing unit wherein the control flow processor drives the math processing unit; and
   wherein the vertex grouper tessellator retrieves the tessellation factors in a second pass such that the vertex grouper tessellator generates a per process vector output, a per primitive output and a per packet output.

8. The apparatus of claim 7
   wherein a plurality of coordinates are generated by the vertex grouper tessellator in the second pass in response to the plurality of tessellation factors.

9. The apparatus of claim 8 wherein the plurality of coordinates are at least one of: barycentric coordinates and tensor coordinates.

10. The apparatus of claim 8
    wherein a plurality of tessellated vertices are generated by the plurality of vertex shaders in response to a plurality of control points and the plurality of coordinates.

11. The apparatus of claim 7 wherein a plurality of control points for higher order surfaces are generated by the plurality of vertex shaders based on a plurality of corner vertices of a plurality of primitives.

12. A method for dual pass adaptive tessellation comprising:
    in a first pass:
       receiving primitive information and an index list, wherein the index list is received from a memory device;
       generating primitive indices from the primitive information and an auto-index value for each of the primitive indices;
       generating a plurality of shader sequence outputs;
       providing the shader sequence outputs to a plurality of vertex shader input staging registers; and
       generating a plurality of tessellation factors in response to the plurality of shader sequence outputs; and
    in a second pass:
       receiving the tessellation factors as a plurality of indices.

13. The method of claim 12 further comprising:
    during the second pass:
    generating an auto-index value for each of the plurality of indices;
    generating a plurality of coordinates based on the plurality of tessellation factors; and computing a plurality of tessellated vertices by fetching a control point specified by the auto-index value for each of the plurality of indices.

14. The method of claim 13 wherein the coordinates are at least one of barycentric coordinates and tensor coordinates.

15. The method of claim 12 further comprising:
providing the shader sequence outputs to a plurality of vertex shaders which are operably coupled to the vertex shader input staging registers.

16. The method of claim 12 further comprising:
prior to the second pass, writing the plurality of tessellation factors to a memory device; and
during the second pass, receiving the tessellation factors from the memory device.

17. The method of claim 16 wherein the tessellation factors are received from the memory device using a direct memory access.

18. A method for dual pass adaptive tessellation comprising:
in a first pass:
receiving vertex information and an index list, wherein the index list is received from a memory device;
generating primitive indices from the vertex information and an auto-index value for each of the primitive indices;
generating a plurality of shader sequence outputs;
providing the plurality of shader sequence outputs to a plurality of vertex shader input staging registers; and
generating a plurality of tessellation factors in response to the plurality of shader sequence outputs; and
in a second pass:
receiving the plurality of tessellation factors as a plurality of indices;
generating an auto-index value for each of the plurality of indices;
generating a plurality of barycentric coordinates based on the plurality of tessellation factors; and
computing a plurality of tessellated vertices by fetching a control point specified by the auto-index value for each of the plurality of indices.

19. The method of claim 18 further comprising:
providing the plurality of shader sequence outputs to a plurality of vertex shaders which are operably coupled to the vertex shader input staging registers.

20. The method of claim 18 further comprising:
prior to the second pass, writing the plurality of tessellation factors to the memory device; and
during the second pass, receiving the tessellation factors from the memory device.

21. A method for dual pass adaptive tessellation comprising:
in a first pass:
receiving vertex information and an index list, wherein the index list is received from a memory device;
generating primitive indices from the vertex information and an auto-index value for each of the primitive indices;
generating a plurality of shader sequence outputs;
providing the plurality of shader sequence outputs to a plurality of vertex shader input staging registers; and
generating a plurality of tessellation factors in response to the plurality of shader sequence outputs; and
in a second pass:
receiving the plurality of tessellation factors as a plurality of indices;
receiving a primitive type indicator; and
generating a set of coordinates based on the plurality of indices and the primitive type indicator.

22. The method of claim 21 further comprising:
during the second pass:
generating an auto-index value for each of the plurality of indices;
generating a plurality of barycentric coordinates based on the tessellation factors; and
computing a plurality of tessellated vertices by fetching a control point specified by the auto-index value for each of the plurality of indices.

23. The method of claim 21 further comprising:
receiving a vertex reuse number; and
generating a plurality of vertices based on the vertex reuse number.

24. The method of claim 21 wherein the set of coordinates are parametric coordinates when the vertices define a plurality of tensor product surfaces and the set of coordinates are barycentric coordinates when the vertices define a plurality of triangular surfaces.

25. The method of claim 21 further comprising:
generating a plurality of sub-primitive vertices information.

* * * * *